Nov. 25, 1969     T. J. McMAHON     3,480,386
PROCESS FOR ACID DIGESTION OF TITANIFEROUS MATERIALS
Filed Sept. 26, 1967
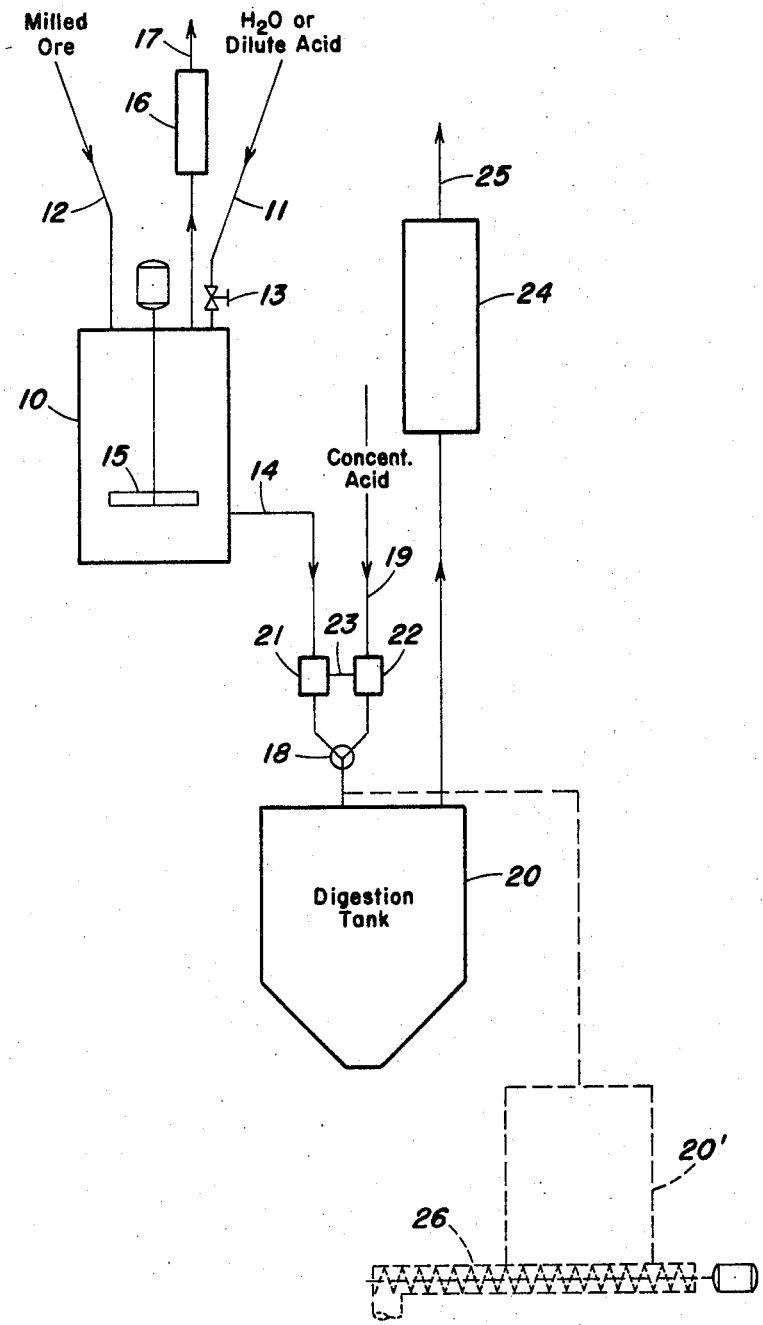
INVENTOR.
Thomas J. McMahon
BY
*Harold L. Gammons*
AGENT United States Patent Office 3,480,386
Patented Nov. 25, 1969

3,480,386
PROCESS FOR ACID DIGESTION OF
TITANIFEROUS MATERIALS
Thomas J. McMahon, Plainfield, N.J., assignor to National
Lead Company, New York, N.Y., a corporation of
New Jersey
Filed Sept. 26, 1967, Ser. No. 670,555
Int. Cl. C01g 23/00
U.S. Cl. 23—117                                  11 Claims

ABSTRACT OF THE DISCLOSURE

The present invention relates to an improved process for digesting titaniferous materials in concentrated sulfuric acid wherein the finely ground titaniferous material is mixed, initially, with an aqueous medium such as water or a dilute sulfuric acid to form a homogeneous slurry of relatively high solids content, and a stream of this slurry is then added continuously to a stream of concentrated surfuric acid, the rate of flow of which is regulated by the flow rate of the stream of slurry.

Background of the invention

The invention relates to the art found in Class 23 Chemistry Subclass 117 and related subclasses.

Many methods have been proposed for recovering the titanium and iron values from titaniferous iron ores by digesting the ore in concentrated mineral acids to solubilize the iron and titanium values. From a commercial standpoint the most successful of these methods has been a batch digestion procedure in which the titaniferous iron ore is heated with concentrated sulfuric acid in a large digestion tank. In such a process measured quantities of ore and acid are added to the tank. Stream and/or water or waste sulfuric acid are then added and the heat generated by dilution of the concentrated mineral acid raises the temperature of the mass to its reaction temperature. As soon as the reaction temperature is reached, an extremely violent reaction occurs and in a matter of a few minutes the entire mass converts to a porous solidified substance commonly referred to as "digestion cake." This cake is then retained in the digestion tank for a number of hours in order to cure. After curing, the cake is dissolved in water or weak acid to obtain an iron sulfate, titanium sulfate solution. Such a process is more fully described and claimed in U.S. Patent No. 1,889,027.

This batch digestion process has been used commercially for the past 30 years, and only very slight changes have been made in the operating procedure during this time for, as far as was known, little could be done to alter this procedure without adversely affecting the extraction of the titanium fraction.

However despite its longevity the batch type process suffers from a number of disadvantages. The reaction between the ore and acid is limited to the utilization of certain reaction temperatures and acid concentrations. If, for example, the reaction temperature is allowed to go too high for a given ore, the reaction becomes so violent that it is impossible to retain the reaction mass in the digestion tank. Another disadvantage is that only certain types of titaniferous ores and concentrates may be used in this process. It was found, for example, that many ilmenite concentrates obtained from the various flotation processes produced such violent digestion reactions that even the employment of foam depressors could not suppress the violence of reaction to the extent that the reaction mass would not flow out of the top of the tank. As a result, great care has to be taken in selecting certain flotation agents which would produce flotation concentrates which could be used successfully in the commercial batch digestion process described above. In addition, various types of titanium slags and concentrates are by nature so extremely active when digested in concentrated sulfuric acid that they also could not be processed by the normal batch digestion procedure. In addition to these disadvantages are the large losses of heat and the escape of objectionable quantities of acid mist, $SO_3$, finely divided ore, and particles of the digestion cake into the atmosphere during these violent reactions.

A more recent development in this field is the semi-continuous digestion process described in U.S. 3,053,625, Doll et al. Sept. 11, 1962. This process is designed especially for digesting various types of titaniferous materials in a manner which minimizes the violence of the digestion reaction and hence alleviates the problem of air pollution. Briefly, this procedure is carried out by continuously adding incremental portions of the titaniferous material and concentrated mineral acid to a small mixing tank or device which discharges continuously into the reaction tank simultaneously with a properly proportioned stream of water or waste mineral acid. The resulting continuous series of reactions occur on top or in the middle of previously formed cake resulting from previous additions of the reactants. Under optimum operating conditions this semi-continuous process offers many advantages over the earlier batch type process. Since the reaction takes place over much larger period of time the violence of the reaction and adverse effect on equipment is much less severe. In addition the rate of evolution of the resulting gaseous components is reduced to a level where these emissions can be brought under satisfactory control. However most plant scale operations are seldom if ever carried out under optimum operating conditions and in point of fact one of the most difficult to control is that of maintaining a uniform flow of milled titaniferous material to the mixing vessel. The seriousness of this problem can be best appreciated when one realizes that the finely divided titaniferous materials are transported by bucket elevators and conveyors and from thence dispatched to the mixer via feed devices in which the titaniferous materials frequently stick, bridge, plug or leak out from faulty connections. Consequently ore feed rate is always erratic and hence a serious deterrent to maintenance of uniform operating conditions and optimum titanium recoveries. It is axiomatic in this art that for high recoveries of titanium at least two controls are essential namely: (1) good dispersion of the titaniferous material in the concentrated mineral acid, and (2) maintenance of the weight ratio of titaniferous material to acid within a very narrow range; and that for each of these the ore feed rate is the principal controlling factor.

The present invention is the discovery of an improvement in the semi-continuous digestion process of the above identified Doll et al. patent wherein the aforesaid controls essential to high recoveries of titanium ore are achieved despite the problems attending non-uniform ore feed.

Summary of the invention

The improved process of this invention relates to the acid digestion of various titaniferous materials such as ilmenite ore, titaniferous ore concentrates and slags with sulfuric acid under reaction conditions such that not only are titanium recoveries optimum but the reaction is always closely controlled and essentially non-violent whereby the digestion stack losses are held to a minimum; and is carried out, semi-continuously or continuously, by employing a finely ground titaniferous material having a particle size the major portion of which is less than 200 mesh, slurrying the finely ground material in a measured amount of water or a dilute mineral acid, i.e., waste sulfuric acid of from 18 to 45% acid concentration to form a slurry having a predetermined solids content, continuously feeding a stream of this slurry together with a separate stream of the concentrated $H_2SO_4$, the flow rate of which is controlled by the flow rate of the slurry, to mixing apparatus located preferably at the top of the digestion tank where the components of the two streams are continuously and intimately admixed the heat generated by dilution of the concentrated $H_2SO_4$ initiating reaction of the titaniferous material and concentrated acid. From the mixing apparatus the reactants drop immediately into the bottom of the digestion tank where heat provided initially by the admission of steam and thereafter by the exothermic reaction carries the reaction to completion forming thereby a porous digestion cake in the bottom of the digestion tank, additional digestion cake being continuously formed and deposited on that previously made until all of admixed slurry and concentrated acid have been added.

In order to insure optimum conversion of the titanium and iron values to water soluble sulfates it is customary to hold the digestion cake at elevated temperatures for an appreciable length of time and this may be done semi-continuously, according to the present invention, by retaining all of the digestion cake in the tank after a run has been completed. Following curing the digestion cake is then dissolved in an aqueous medium to recover the titanium and iron values at the corresponding sulfates. As an alternative to the above described semi-continuous operation the reactants may be charged into an appropriate vessel fitted at its bottom with a suitable conveyor whereby the digestion cake is removed continuously from the vessel at an appropriate rate and transported to another point where the cake is cured and dissolved in a normal manner.

Preferred embodiment of the invention

A preferred embodiment of the invention is illustrated in the drawing which is flow diagram showing, schematically, tanks and pipe lines that may be used in the process of the invention. The slurry tank is shown at 10 to which a dilute acid, i.e., waste $H_2SO_4$, or water, is fed via pipe line 11 and a finely ground ilmenite ore or slag is fed by pipe line 12. A flow regulating valve 13 is shown in the pipe 11 for regulating the addition of water or dilute $H_2SO_4$ acid to the tank in accordance with the solids content of the slurry leaving the tank 10 via pipe line 14. Supported within the tank 10 is a rotatable blade 15 for thoroughly mixing the ore and dilute acid in the tank. The tank 10 is provided with a scrubber 16 for the removal of $SO_2$, $H_2S$ and the like before exiting to the atmosphere through stack 17.

The slurry feed pipe 14 and the acid feed pipe 19 are connected to a mixing device 18. The latter may be a simple Y-shaped pipe connection or may be a mixing pump of more sophisticated design typical of which is the mixing pump described in co-pending application, Knudsen et al. Ser. No. 612,970, filed Jan. 31, 1967 and assigned to the assignee of the instant invention.

In any event the mixing device 18 is mounted on the top of a digestion tank 20 and is adapted to feed a mixture of the slurry and concentrated mineral acid into the digestion tank. Both the slurry feed line 14 and the concentrated mineral acid feed line 19 are provided with a metering device 21 and 22 respectively, the metering device 22 being tied-in to the metering device 21, as indicated on the connection 23, so as to be controlled automatically by the metering device 21 as for the purpose hereinafter described.

The digestion tank 20 is provided with a scrubber 24 for removing acid mist, $H_2S$, $SO_2$ and the like from the reaction gases that otherwise could escape to the atmosphere through stack 25. The use of scrubbers on digestion tank stacks, is, of course, normal practice but prior to the instant invention the volume of reacting gases has been so huge that no scrubbers within reason, i.e. from the standpoint of size, cost of construction and maintenance, have been capable of satisfactorily cleaning the stack gases. However, by practicing the improved process of the present invention wherein a stream of aqueous slurry is mixed continuously with a stream of concentrated $H_2SO_4$ to form digestion cake semi-continuously or continuously as the case may be, only relatively small quantities of these materials are reacted at any one time and as a consequence the digestion reaction is relatively mild and the volume of stack gases including ore particles, $H_2SO_4$ mist, $SO_2$, $H_2S$ and the like is diminished to a point where they can be completely removed by conventional gas scrubbing equipment. Under optimum conditions, scrubbing equipment may not be necessary.

Referring again to the drawing the digestion tank 20 may be of conventional design and adapted to retain the porous digestion cake as it is being formed—and also while it is being cured and subsequently dissolved according to the usual batch type process in the industry. However the process of the present invention is conductive to a continuous operation wherein the reactants are discharged into a vessel 20' such as indicated by the dotted lines in the drawing, which vessel 20' is equipped with a suitable conveyor 26 for removing the cake continuously from the vessel 20', the cake then being cured either continuously or batch-wise and subsequently dissolved in a separate tank.

As mentioned at the outset the process of this invention is carried out by using finely ground titaniferous materials, the better to insure homogeneous slurries and accurate control of the ratio of ore to acid necessary for high recoveries of the titanium values. Ground ilmenite ore, ore concentrates or slags the major portion of which is of a particle size no greater than 200 mesh, by Tyler screen measurement, have been found to be particularly satisfactory.

The amount of concentrated mineral acid, i.e. $H_2SO_4$ employed is dependent upon an analysis of the particular titaniferous material used. It is desirable to add sufficient sulfuric acid to produce both titanium sulfate and iron sulfates from the titanium and iron values in the titaniferous material employed. Usually the theoretical amount of sulfuric acid is employed and particularly amounts to obtain an acid:ore ratio, at reaction, of from 1.1:1 to 1.7:1 calculated on a 100% acid basis.

It is desirable of course to use an acid strength at reaction as high as possible both to promote the speed of reaction and the dissolution of the titanium and iron values; and it has been found that by using the improved process of this invention concentrated $H_2SO_4$ of at least 93% to as high as 104.5% may be used which when diluted by the water in the aqueous slurry will give an acid concentration at reaction from 84 to 91%.

For reasons of economy and in order to achieve the advantages of the present invention the slurry of titaniferous material must be of high solids content and yet be pumpable through the feed lines. For a system using ilmenite ore a pumpable slurry is one comprising from 50 to 80% solids; and for slags from 66 to 87% solids the percent solids being determined by the concentration and quantity of the concentrated mineral acid. As indicated above the slurry may be made with water or waste sulfuric acid of various concentrations. The latter has several advantages such as for example, reducing the amount of concentrated acid required for digestion and permitting the use of digestion acids of higher concentrations. Also while the waste sulfuric acids are not sufficiently concentrated to initiate reaction of the ore and acid nevertheless some $SO_2$ and $H_2S$ may be generated and discharged from the system via the slurry tank stack but in such small quantities as to be readily prevented, by suitable scrubbers, from escaping into the atmosphere.

In this connection the use of the aqueous slurry is one of the most significant aspects of the present invention. This slurry is prepared in a separate mix tank using either water or a dilute waste sulfuric acid. Hence no reaction with the titaniferous materials is initiated, and consequently relatively large quantities of slurry may be prepared and held in readiness for feeding to the mixing zone. In this respect the slurry supply tank functions as buffer-means against erratic ore feed in that if a less than normal quantity of ore is fed to the slurry tank a corresponding smaller quantity of water or dilute waste acid is added thereby maintaining the solids content of the slurry substantially constant.

Moreover inasmuch as no reaction is initiated in the mix tank the components may be thoroughly mixed by agitation, for more effective wetting of the ore particles thus enhancing the efficiency of the subsequent reaction of the ore with the concentrated mineral acid. Having established a slurry stream of substantially constant solids, i.e. ore content, the invention embodies the additional steps of metering the rate of flow of the concentrated $H_2SO_4$ in accordance with the flow rate of the slurry. Since the total amount of $H_2SO_4$ used is normally the theoretical amount required to convert all of the iron and titanium values to the corresponding sulfates it is thus possible, by metering the flow of concentrated acid in accordance with the flow rate of a slurry (waste acid or water) of substantially constant solids (ore) content, constantly to maintain a preferred ratio of acid to ore (usually from 1.1:1 to 1.7:1) with great accuracy throughout the entire digestion sequence thereby insuring optimum recoveries of the titanium and iron values as water soluble sulfates.

Having prepared a titaniferous slurry of predetermined solids content it is fed via feed pipe 14 to the mixing zone 18 where it is brought into contact with concentrated sulfuric acid at the highest concentration possible commensurate with the composition of the ore and the ore-slurry.

At the mixing zone the slurry and acid are brought into intimate contact whereupon the heat generated by dilution of the concentrated acid initiates reaction of the ore and acid. The reacting mixture of ore and acid is dropped immediately into the bottom of the digestion tank. As start-up steam may be introduced into the bottom of the digestion tank to accelerate the reaction but as more of the reacting mixture is added the heat generated by the exothermic nature of the reaction will suffice to carry the reaction to completion.

The porous digestion cake formed in the tank may be cured and then dissolved in situ in the usual manner; or the digestion cake may be continuously removed from the digestion tank by a suitable conveyor as the cake is formed, the curing and dissolution of the cake then being done outside the tank.

In order to illustrate the invention further the following examples are presented:

EXAMPLE I

An ilmenite ore was ground to pass through a 200 mesh screen. The ore has the following analysis:

| | Percent |
|---|---|
| $TiO_2$ | 44–45 |
| $FeO$ | 37–39 |
| $Fe_2O_3$ | 6–8 |
| Other oxides | 8–13 |

41,000 pounds of this finely ground ore were fed to the slurry tank and thoroughly mixed with 13,900 pounds of waste sulfuric acid of 18% acid concentration to form a homogeneous non-reactive slurry of 70 percent solids. 54,900 pounds of this slurry were then fed continuously to the mxing zone at a uniform rate of 32 gallons per minute, over a period of 70 minutes. Simultaneously 58,000 pounds of concentrated $H_2SO_4$ of 98% acid strength were fed at a rate controlled directly by the feed rate of the slurry, to the mixing zone the rate of feed being 55 gallons per minute.

At the mixing zone the acid was thoroughly mixed with the slurry the acid to ore ratio, at reaction, being 1.45. The heat of dilution of the concentrated acid raised the temperature of the mixture to 80–100° C. whereupon reaction of the ore and acid was initiated. The reacting materials were dropped continuously into the bottom of the tank where the heat required to continue the reaction was supplied initially by introducing steam at 110° C. Subsequently the heat developed by the exothermic nature of reaction provided the heat necessary to continue the reaction the temperature in the tank rising to a maximum of 200° C. The entire 41,000 pounds of ore was reacted over a period of 70 minutes, during which time the acid to ore ratio at reaction remained substantially constant at 1.45. The porous digestion cake thus formed was allowed to cure for two hours during which time the temperature in the tank dropped from 200° C. to 150° C. The digestion cake was then dissolved by the addition of 1500 cu. ft. $H_2O$ with air, agitation over a period of 6 hours and the solution so formed was analyzed and found to contain 96.8% of the titanium values and 98.0% of the iron values originally present in the ilmenite ore employed.

The gas flow rate from the digestion tank stack was less than 20,000 cu. ft./min.

As explained above the success of the improved digestion process of the invention lies in the discovery of a way for maintaining accurate control of the acid to ore ratio at reaction throughout the entire digestion period; and this is done by mixing the ore with water or a weak acid to form an aqueous ore slurry which, being non-reactive per se, can be made up with a specific (ore) solids content despite fluctuations in the ore feed; and since the slurry is pumpable it can be metered at an accurately controlled rate to a mixing zone where it is mixed with the concentrated mineral acid. Moreover since the flow rate of the concentrated mineral acid is controlled by the flow rate of the slurry an extremely accurate control of the ore to acid ratio at reaction is assured. It will be apparent therefore that maintenance of a slurry of constant composition and flow rate is indicative of a constant ratio of acid to ore at reaction.

The experiment described above was done on a plant scale using an aqueous slurry of 70% solids which was fed to the digestion tank at a uniform rate of 32.0 gallons per minute for 70 minutes (the entire digestion period). Additional plant scale runs were made using the ilmenite ore and waste acid described in Example I but with various slurry compositions, slurry flow rates and length of run. Throughout each of these runs the flow rate of an aqueous slurry of specific solids content was accurately controlled throughout the digestion period.

The following table shows the slurry compositions, the flow rates, the length of time the rate of flow remained constant for these runs, the acid/ore ratio at reaction and the $TiO_2$ recoveries.

TABLE

| Run No. | Slurry comp. (percent solids) | Slurry flow rate, gals./min. | Ratio acid to ore at reaction | Length of run (min.) | Recovery of titanium values, percent |
|---|---|---|---|---|---|
| I | 70.0 | 32 | 1.45 | 70 | 96.8 |
| II | 71.6 | 51 | 1.36 | 45 | 94.6 |
| III | 73.5 | 45 | 1.31 | 50 | 93.2 |
| IV | 73.7 | 43 | 1.45 | 55 | 93.0 |
| V | 67.7 | 40 | 1.48 | 65 | 91.4 |
| VI | 71.7 | 51 | 1.31 | 45 | 95.1 |
| VII | 70.6 | 50 | 1.49 | 50 | 96.7 |

From the foregoing data it will be evident that the discovery of the present invention now makes it possible to carry out a semi-continuous or continuous digestion process on a plant scale under reaction conditions such that optimum recoveries of the titanium and iron values are assured while controlling the reaction rate so that the rate of evolution of stack gases during digestion is relatively small and as a consequence any obnoxious fumes can be readily removed from the stack gases by conventional gas scrubbing devices if necessary.

While this invention has been described and illustrated by the examples shown, it is not intended to be strictly limited thereto, and other variations and modifications may be employed within the scope of the following claims.

I claim:

1. In a process for continuously digesting a finely divided titaniferous material selected from the group consisting of a titaniferous iron ore, an ore concentrate and a slag to render the titanium and iron values soluble in aqueous media wherein the titaniferous material is reacted with strong sulfuric acid at elevated temperatures to form a digestion cake which is subsequently cured and then dissolved in aqueous media the improvement comprising: mixing said finely divided titaniferous material with an aqueous medium selected from the group consisting of water and a dilute sulfuric acid to form an aqueous slurry of predetermined solids content, agitating the slurry to form a homogeneous mixture, feeding a stream of the homogeneous slurry and a stream of concentrated sulfuric acid to a mixing zone, regulating the flow rate of said stream of concentrated sulfuric acid in accordance with the flow rate of said stream of homogeneous slurry to effect an acid:ore ratio of from 1:1 to 1.7:1 and discharging the admixed slurry and concentrated sulfuric acid into a digestion zone for reaction and the formation of a digestion cake therein.

2. In a process for continuously digesting a finely divided titaniferous material according to the improvement of claim 1 wherein said titaniferous material and aqueous medium are admixed in proportion to form a slurry of from 70 to 90% solids on a weight basis.

3. In a process for continuously digesting a finely divided titaniferous material according to the improvement of claim 2 wherein the rate of feed of said stream of homogeneous slurry and said stream of concentrated acid, respectively, are metered prior to mixing, the metered flow rate of said concentrated acid being automatically controlled in accordance with variations in the metered flow rate of said slurry.

4. A process for continuously digesting a finely divided titaniferous material according to the improvement of claim 3 wherein said aqueous medium is water.

5. A process for continuously digesting a finely divided titaniferous material according to the improvement of claim 3 wherein said aqueous medium is waste sulfuric acid of from 18% to 45% and said concentrated acid is at a concentration of from 93.0 to 104.5%.

6. A process for continuously digesting a finely divided titaniferous material according to the improvement of claim 1 wherein said titaniferous material is ilmenite ore.

7. A process for continuously digesting a finely divided titaniferous material according to the improvement of claim 1 wherein said titaniferous material is a titaniferous ore concentrate.

8. A process for continuously digesting a finely divided titaniferous material according to the improvement of claim 1 wherein said titaniferous material is a slag.

9. A process for continuously digesting a finely divided titaniferous material selected from the group consisting of a titaniferous iron ore, and an ore concentrate and a slag to render the titanium and iron values soluble in aqueous media which comprises: mixing said finely divided titaniferous material with an aqueous media selected from the group consisting of water and dilute sulfuric acid to form a slurry, agitating the slurry vigorously to form a homogeneous mixture, feeding a stream of the homogeneous aqueous slurry and a separate stream of a concentrated sulfuric acid to a mixing zone adjacent to the upper end of a digestion zone, controlling the rate of feed of said stream of concentrated sulfuric acid to said mixing zone in accordance with the feed rate of said stream of homogeneous aqueous slurry to effect an acid to ore ratio within the range of from 1:1 to 1.7:1, thoroughly mixing said homogeneous aqueous slurry and said concentrated sulfuric acid at said mixing zone and initiating reaction of said titaniferous material and said concentrated sulfuric acid at said mixing zone by heat generated by dilution of said concentrated sulfuric acid with said aqueous slurry, continuously charging the reactants into said digestion zone, further heating the reactants in said digestion zone by the exothermic heat generated by reaction of the titaniferous material and concentrated sulfuric acid to form a porous digestion cake, curing said porous digestion cake to insure optimum conversion of the titanium and iron values to the corresponding water soluble sulfates and subsequently dissolving the cured digestion cake in aqueous media.

10. A process for continuously digesting a finely divided titaniferous material according to claim 9 wherein the digestion cake is cured in said digestion zone and an aqueous media is subsequently added to dissolve said digestion cake in situ.

11. A process for continuously digesting a finely divided titaniferous material according to claim 9 wherein the porous digestion cake is withdrawn continuously from said digestion zone at a rate corresponding substantially to the rate at which it is formed therein the withdrawn cake being cured and subsequently dissolved in aqueous media remote from said digestion zone.

References Cited

UNITED STATES PATENTS

| | | | |
|---|---|---|---|
| 1,919,425 | 7/1933 | Farup | 23—117 |
| 2,109,917 | 3/1938 | Dunn | 23—202 XR |
| 2,180,961 | 11/1939 | Kramer | 75—115 |

OSCAR R. VERTIZ, Primary Examiner

G. O. PETERS, Assistant Examiner

U.S. Cl. X.R.

23—202, 312; 75—101, 115